United States Patent
Dasgupta et al.

(10) Patent No.: US 10,423,181 B2
(45) Date of Patent: Sep. 24, 2019

(54) GEOMAGNETICALLY INDUCED POTENTIAL COMPENSATION

(71) Applicant: International Business Machines Corporation, Armonk, NY (US)

(72) Inventors: Kalyan Kanti Dasgupta, Bangalore (IN); Jagabondhu Hazra, Bangalore (IN); Manikandan Padmanaban, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 85 days.

(21) Appl. No.: 15/475,785

(22) Filed: Mar. 31, 2017

(65) Prior Publication Data
US 2018/0284827 A1    Oct. 4, 2018

(51) Int. Cl.
*H01F 27/34* (2006.01)
*G05F 1/625* (2006.01)
(Continued)

(52) U.S. Cl.
CPC ............ *G05F 1/625* (2013.01); *G05B 15/02* (2013.01); *H02J 3/00* (2013.01)

(58) Field of Classification Search
None
See application file for complete search history.

(56) References Cited

U.S. PATENT DOCUMENTS

| | | | |
|---|---|---|---|
| 5,179,489 A | | 1/1993 | Oliver |
| 5,663,636 A | * | 9/1997 | Falldin ............... H02J 3/01 323/356 |

(Continued)

FOREIGN PATENT DOCUMENTS

| | | |
|---|---|---|
| JP | 2012503467 A | 2/2012 |
| WO | WO2015139743 A1 | 9/2015 |

OTHER PUBLICATIONS

Powerworld Corporation, "Steady-State Power System Security Analysis with PowerWorld Simulator", S12: Geomagnetically Induced Current (GIC) Modeling, 2015, 50 pages, PowerWorld Corporation, Champaign, Illinois, USA.

(Continued)

*Primary Examiner* — Mohammad Ali
*Assistant Examiner* — Vincent W Chang
(74) *Attorney, Agent, or Firm* — Ference & Associates LLC

(57) ABSTRACT

One embodiment provides a method, including: utilizing at least one processor to execute computer code that performs the steps of: receiving forecasted geomagnetic information caused by solar activity; estimating, using the forecasted geomagnetic information, a geomagnetically induced potential for each of a plurality of transformers operatively coupled to a transmission line, wherein the geomagnetically induced potential is created by geomagnetic disturbances identified using the forecasted geomagnetic information; determining an optimized compensation voltage to be applied to at least one of the plurality of transformers operatively coupled to the transmission line, wherein the optimized compensation voltage comprises a voltage that reduces the potential difference, caused by the induced potential, between neutral lines of the plurality of transformers; and applying the optimized compensation voltage to at least one of the plurality of transformers operatively coupled to the transmission line. Other aspects are described and claimed.

18 Claims, 3 Drawing Sheets

(51) Int. Cl.
    *G05B 15/02*     (2006.01)
    *H02J 3/00*     (2006.01)

(56) References Cited

U.S. PATENT DOCUMENTS

| | | | |
|---|---|---|---|
| 5,673,366 A * | 9/1997 | Maynard | G01W 1/10 |
| | | | 706/10 |
| 8,035,935 B2 | 10/2011 | Ramirez et al. | |
| 2007/0217103 A1 | 9/2007 | AF Klercker Alakula et al. | |
| 2016/0301204 A1 * | 10/2016 | Niehoff | H02H 3/24 |
| 2016/0370478 A1 * | 12/2016 | Ouzounov | G01V 1/008 |
| 2017/0213642 A1 * | 7/2017 | De Leon | H01F 27/385 |

OTHER PUBLICATIONS

Viana, W.C. et al., "Transformer Design Considerations for Mitigating Geomagnetic Induced Saturation", IEEE Transactions on Magnetics, Sep. 1999, 3 pages, vol. 35, No. 5, IEEE Digital Library.

* cited by examiner

GEOMAGNETICALLY INDUCED POTENTIAL COMPENSATION

BACKGROUND

Different space and atmospheric activities have an effect on objects on the surface of the planet, for example, solar activity can cause geomagnetic activity which can affect electrical objects (e.g., electrical transmission lines, transformers, etc.). As an example, a space weather event may cause electric currents in the magnetosphere and ionosphere to experience large variations, which also affect the Earth's magnetic field. The variations in the magnetic field can induce currents in conductors on or under the surface of Earth. For example, the variations may induce currents in transmission grids, buried pipelines, undersea communication cables, telephone networks, and the like. The induced potentials may increase corrosion of steel, damage power transformers, and the like. In the case of a transformer, this induced potential can be driven through the neutral of the transformer, causing the transformer to operate in half-cycle saturation mode. While operating in half-cycle saturation mode harmonics are generated, windings of the transformer can be lost and heated, the reactive power demand can increase, and the like. These problems can lead to the deterioration and sometimes failure of the transformer and/or transmission line.

BRIEF SUMMARY

In summary, one aspect of the invention provides a method, comprising: utilizing at least one processor to execute computer code that performs the steps of: receiving forecasted geomagnetic information caused by solar activity; estimating, using the forecasted geomagnetic information, a geomagnetically induced potential for each of a plurality of transformers operatively coupled to a transmission line, wherein the geomagnetically induced potential is created by geomagnetic disturbances identified using the forecasted geomagnetic information; determining an optimized compensation voltage to be applied to at least one of the plurality of transformers operatively coupled to the transmission line, wherein the optimized compensation voltage comprises a voltage that reduces the potential difference, caused by the geomagnetically induced potential, between neutral lines of the plurality of transformers; and applying the optimized compensation voltage to at least one of the plurality of transformers operatively coupled to the transmission line.

Another aspect of the invention provides an apparatus, comprising: at least one processor; and a computer readable storage medium having computer readable program code embodied therewith and executable by the at least one processor, the computer readable program code comprising: computer readable program code that receives forecasted geomagnetic information caused by solar activity; computer readable program code that estimates, using the forecasted geomagnetic information, a geomagnetically induced potential for each of a plurality of transformers operatively coupled to a transmission line, wherein the geomagnetically induced potential is created by geomagnetic disturbances identified using the forecasted geomagnetic information; computer readable program code that determines an optimized compensation voltage to be applied to at least one of the plurality of transformers operatively coupled to the transmission line, wherein the optimized compensation voltage comprises a voltage that reduces the potential difference, caused by the geomagnetically induced potential, between neutral lines of the plurality of transformers; and computer readable program code that applies the optimized compensation voltage to at least one of the plurality of transformers operatively coupled to the transmission line.

An additional aspect of the invention provides a computer program product, comprising: a computer readable storage medium having computer readable program code embodied therewith, the computer readable program code executable by a processor and comprising: computer readable program code that receives forecasted geomagnetic information caused by solar activity; computer readable program code that estimates, using the forecasted geomagnetic information, a geomagnetically induced potential for each of a plurality of transformers operatively coupled to a transmission line, wherein the geomagnetically induced potential is created by geomagnetic disturbances identified using the forecasted geomagnetic information; computer readable program code that determines an optimized compensation voltage to be applied to at least one of the plurality of transformers operatively coupled to the transmission line, wherein the optimized compensation voltage comprises a voltage that reduces the potential difference, caused by the geomagnetically induced potential, between neutral lines of the plurality of transformers; and computer readable program code that applies the optimized compensation voltage to at least one of the plurality of transformers operatively coupled to the transmission line.

A further aspect of the invention provides a method, comprising: utilizing at least one processor to execute computer code that performs the steps of: obtaining forecasted solar activity; obtaining parameter information of a plurality of transformers connected to a transmission line, wherein the parameter information identifies a geographic location for each of the plurality of transformers and electrical parameters for each of the plurality of transformers and the transmission line; estimating, based upon the obtained forecasted solar activity and obtained parameter information, a geomagnetically induced potential for the plurality of transformers, caused by geomagnetic disturbances identified using the forecasted solar activity and an estimated time of the geomagnetically induced potential; identifying a compensation voltage to be applied to at least one of the plurality of transformers, wherein the compensation voltage comprises a voltage that reduces the potential difference, caused by the induced geomagnetically induced potential, between neutral lines of the plurality of transformers; and compensating for the geomagnetically induced potential by applying the compensation voltage to at least one of the plurality of transformers using at least one of: a direct current source and a tertiary winding of at least one of the plurality of transformers at the estimated time of the geomagnetically induced potential.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
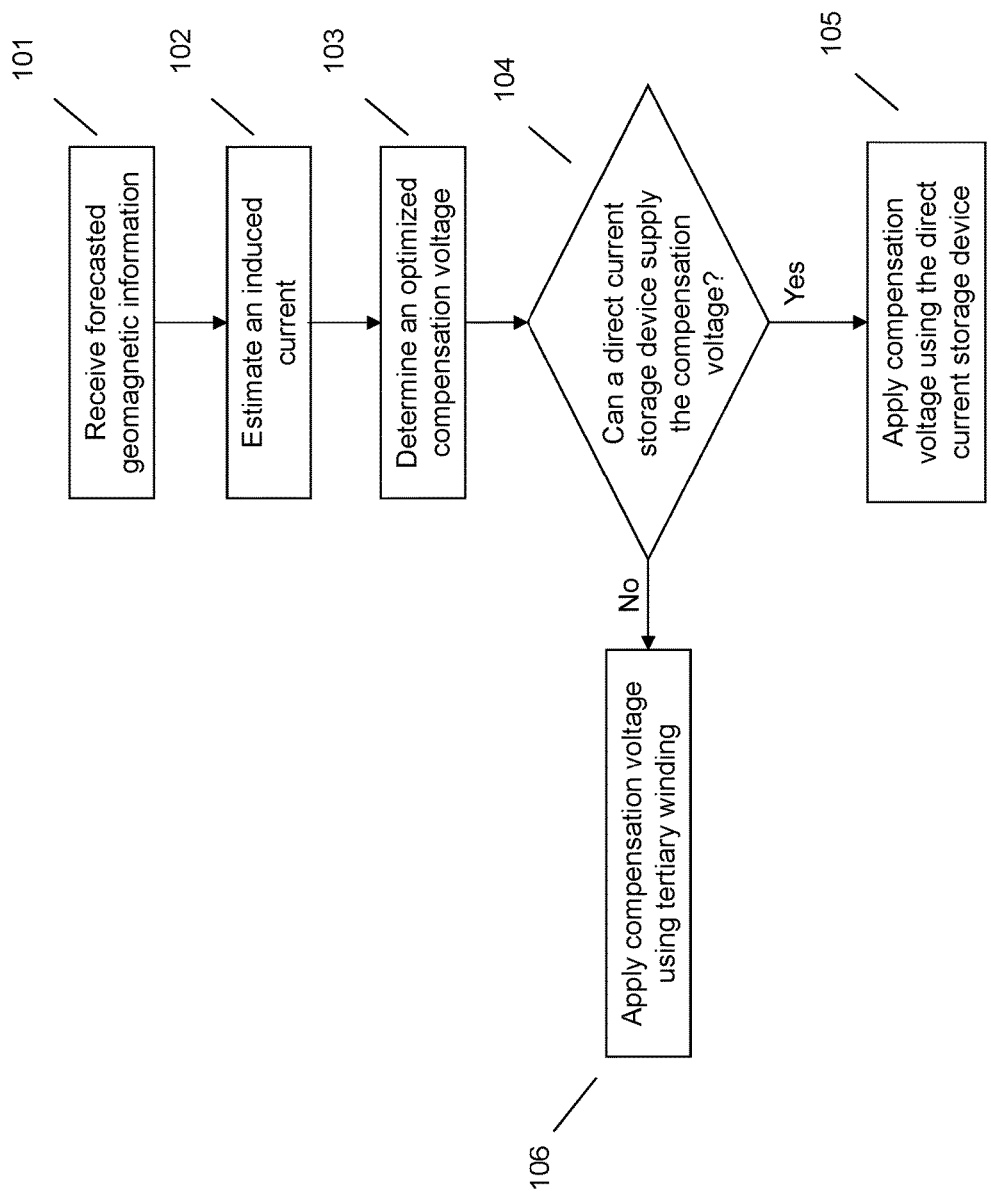
FIG. 1 illustrates a method of compensating for a geomagnetically induced potential.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, most if not all of the process steps, components and outputs discussed with respect to FIGS. 1-2 can be performed or utilized by way of a processing unit or units and system memory such as those indicated, respectively, at 16' and 28' in FIG. 3, whether on a server computer, a client computer, a node computer in a distributed network, or any combination thereof.

Geomagnetically induced potentials (GICs) can cause damage to and failure of conducting networks, for example, underground pipelines, transformer and transmission lines, undersea communication cables, telephone lines, and the like. In the case of a transformer and transmission line, the geomagnetically induced potentials drive a quasi DC current through the neutral of the transformers, particularly when the transformers are star-connected transformers. The geomagnetically induced potentials may lead to the generation of harmonics, winding losses and heating, increase in reactive power demand, leakage flux, and the like. Problems like leakage flux can result in eddy current losses and formation of hot spots which can cause insulation failure and ultimately the failure of the transformer itself.

Current solutions to suppressing the GICs require the use of expensive series capacitors in the neutral or transmission line to block the GICs during geomagnetic activity. For example, one current solution employs resistors, non-linear resistors, direct current (DC) motors, and/or capacitors between the ground and neutral of the transformer in order to suppress the GICs. However, such solutions are expensive and sometimes impractical. For example, the cost of the solution as compared to the frequency of a GIC event may make the installation of the components not cost effective. Another solution uses auxiliary windings of the transformer in the magnetic circuit to compensate the induced magnetomotive force caused by the GICs. However, to add auxiliary winding to existing transformers requires re-engineering the transformer and installing the winding, which may not be feasible or cost effective.

Accordingly, an embodiment provides a method of compensating for a geomagnetically induced potential by reducing or nullifying the effect of the GIC by applying a compensation voltage to one or more of the transformers. The system receives forecasted geomagnetic information that is a result of solar activity. The forecasted information provides information regarding interplanetary magnetic variations, solar wind speed, temperature, and the like. Also, because an inherent time delay exists between the time of a space event and the time that the space event will affect the transformer, the system can also determine a predicted time for the geomagnetic information to affect the transformer.

Using the forecasted geomagnetic information, the system estimates both an induced potential and estimated time of the induced potential, for each of the transformers connected to a transmission line. The induced potential is created by the geomagnetic disturbances identified using the forecasted information. Accordingly, the system is able to estimate a value for the induced potential and a time for when the induced potential will be present within the transformer system. The induced potential may be partially based upon parameter information of the transformers and/or transmission line. For example, depending on the geographic location, the transformer may receive more or less induced potential than a transformer in a different location. Therefore, the system may also identify the geographic location of the transformer and/or transmission line and additional electrical characteristics of the transformer(s) and/or transmission line to estimate the induced potential.

Based upon the estimated induced potential the system may determine an optimized compensation voltage to be applied to one or more of the transformers. The compensation voltage may include an overall voltage to be applied to one or more of the transformers in the transformer system that reduces or eliminates the potential difference between the transformers that is caused by the geomagnetic disturbances. The compensation voltage may be applied to the neutral lines of the transformer(s). The compensation voltage may be optimized to reduce the overall amount of voltage that needs to be applied to the transformer system. The optimized compensation voltage may also be calculated based upon different constraints. For example, the compensation voltage may need to be less than the rated insulation voltage of the transformer neutral lines. As another example, the transformer may have a baseline voltage at the neutral points, and the system may be unable to reduce this voltage to less than the baseline voltage. Accordingly, the compensation voltage may be calculated under the constraint that the voltage cannot be less than this baseline voltage.

Application of the compensation voltage may include charging or discharging one or more of the transformers in the transformer system. For example, if one transformer has an estimated induced voltage equal to 5V and the other has an induced voltage equal to 2V, and the system has determined the optimized compensation voltage is 3V, the system may discharge the transformer from 5V to 3V and charge the other transformer from 2V to 3V. Application of the compensation voltage may include using a direct current (DC) storage device (e.g., battery, solar cells, etc.) to charge the transformer system. If the DC storage device is unable to supply the full amount of the compensation voltage, the system may, in combination with the DC storage device or alone, use the tertiary winding of the transformer. In such a scenario, the voltage from the transformer comprises an alternating current (AC) voltage, so would need to be converted to DC voltage through the use of an AC/DC converter.

Such a system provides a technical improvement over current system for compensating for geomagnetically induced potentials. Rather than requiring expensive additional components to be added to the system or expensive re-engineering of the entire system, the systems and methods described herein can estimate and provide a compensation voltage to reduce or nullify the geomagnetically induced potential. The system is able to estimate the induced potential using forecasted geomagnetic information and parameters of the transformer system and calculate a compensation voltage to be applied to the transformer system. Such a system provides a technical improvement to conventional systems in that new expensive components do not have to be added and the transformer system does not have to be re-engineered. Accordingly, the systems and methods as described herein are more efficient and cost effective than conventional solutions.

For ease of understanding, the example of transformers and transmission lines will be used throughout. However, the systems and methods as described herein may be applied to any system which can be affected by geomagnetically induced potential. For example, the system and methods as described herein can be implemented on buried pipelines, undersea communication cables, telephone lines, and the like. In order to implement the systems and methods described herein on such systems, the systems may require the addition of a direct current storage device or other voltage/current provision source in order to provide the compensation voltage as described herein.

Figure 2:
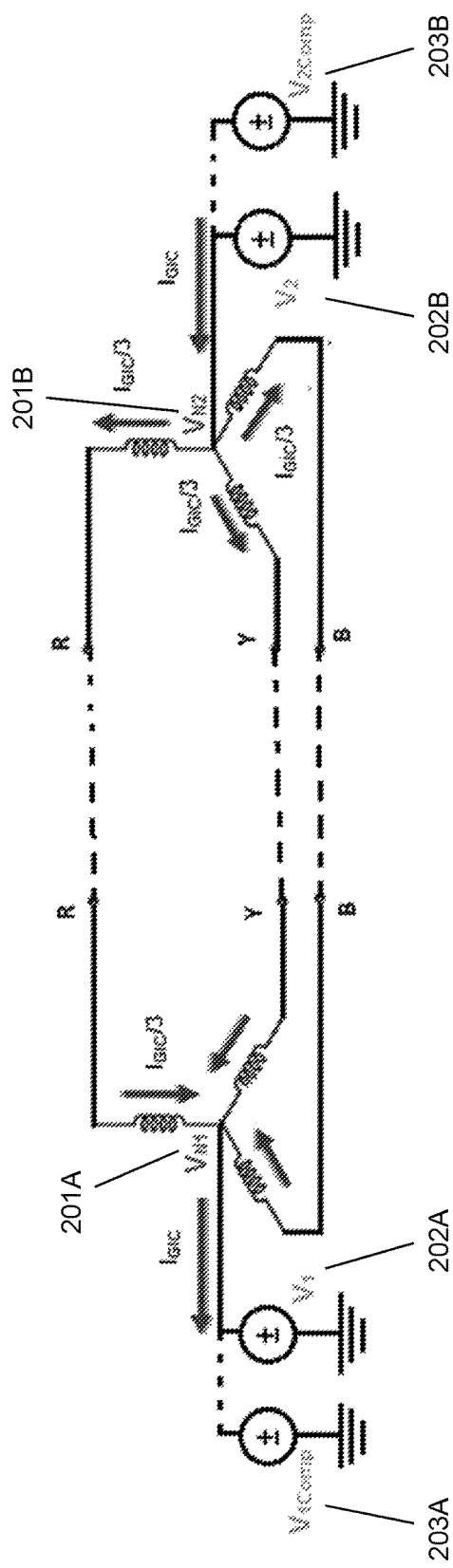
FIG. 2 illustrates an example transformer and transmission line circuit with a compensating voltage.

Referring now to FIG. 1, at 101, the system may receive forecasted geomagnetic information caused by solar activity. The forecasted geomagnetic information may include solar wind speed, proton ion density, temperature, interplanetary magnetic variations, and the like. This information may be received from a space satellite which monitors space weather. During space weather events, or geomagnetic disturbances (GMD), the electric currents in the magnetosphere and ionosphere of the Earth may experience large variations which affect the Earth's magnetic field. The change in the magnetic field produces an electric field at the Earth's surface which may induce voltages in a transformer system (e.g., along the transmission line, at the transformer(s), etc.). The induced voltage then drives the geomagnetically induced potential in the transformer system.

The system may also receive information regarding the transformer(s) and/or transmission line. The transformer system information may include the geographic location of the transformer system. Based upon the location of the geomagnetic disturbance, different geographic locations may experience different geomagnetically induced potentials. For example, a geographic location closer to the GMD may experience higher GICs than a geographic location further from the GMD. The transformer system information may also include electrical parameters of the transformer system. Electrical parameters may include the orientation of the transmission line, length of the transmission line, level of harmonics, and the like. The electrical parameters may also include real-time and historical information related to the electrical parameters. For example, the system may include both the real-time level of harmonics and also the historical high levels and low levels of harmonics.

At 102, using the forecasted geomagnetic information and transformer information, the system may estimate an induced potential for each of the transformers in the transformer system. The induced potential, as discussed above, is created by the geomagnetic disturbances. Due to the inherent time delay in the geomagnetic disturbances reaching Earth, the geomagnetic information will be applicable to a future time. Accordingly, using the geomagnetic information, the system can not only estimate a value for the induced potential, but can also estimate a time that the induced potential will be present at the transformer system. To estimate the induced potential, the system may apply a magnetosphere/ionospheric coupling model to the geomagnetic information. The information from the model may then be sent to an Earth model along with ground resistivity information that correlates to the region of the transformer system and ground magnetometer information that also correlates to the location of the transformer system. The ground magnetometer information measures the magnetic variations of the ground and give near real-time information related to the DC potential near or at the transformer system. The result of the Earth model is then an estimation of the geomagnetically induced potential at or near the transformer system.

The system may also employ a DC potential estimator to assist in estimating the induced DC potential. The DC potential estimator uses a Fast-Fourier Transform (FFT) analyzer and/or Phasor Measurement Unit (PMU) to measure the even harmonics at the transformer system. The even harmonic may then be used to assist in estimating the induced DC potential.

At 103, the system may determine a compensation voltage to be applied to at least one of the plurality of transformers operatively coupled to the transmission line. The compensation voltage may include a voltage that reduces the potential difference, caused by the induced potential, between the neutral lines of the plurality of transformers. FIG. 2 illustrates an example circuit of the transformer system. $V_1$ 202A and $V_2$ 202B represent the estimated geomagnetically induced potential at the neutral of transformer 1 and transformer 2, respectively. $V_{1Comp}$ 203A and $V_{2Comp}$ 203B represent to the compensating voltage applied to transformer 1 and transformer 2, respectively. $V_{N1}$ 201A and $V_{N2}$ 201B represent the resulting voltage seen at the neutral of the transformer 1 and transformer 2, respectively. Accordingly, the system is determining a compensation voltage ($V_{1Comp}$ 203A and $V_{2Comp}$ 203B) that reduces the difference between the voltages ($V_{N1}$ 201A and $V_{N2}$ 201B) seen at the transformers. As an example, if the induced potential at the neutral of transformer 1 ($V_1$ 202A) is equal to 4V, and the induced potential at the neutral of transformer 2 ($V_2$ 202B) is equal to 2V, for a difference of 2V, the system will determine a compensation voltage that the reduces the difference between these two voltages to near or at 0V.

The compensation voltage may be less than one or both of the induced voltages, because the system can discharge one or more of the transformer voltages. In other words, the compensation voltage does not necessarily have to be greater than one or both of the induced voltages. Due to the fact that a DC storage device may be used to apply the compensation voltage, the system may optimize the compensation voltage. The system may also optimize the compensation voltage merely to ensure that the least amount of voltage is introduced into the transformer system. The optimized compensation voltage may be the voltage that results in the potential difference between the neutrals of the transformers to be at or close to zero, but also requires the least amount of compensation voltage to be applied to the system.

In determining the optimized compensation voltage, the optimized compensation voltage may be subject to some constraints. For example, one constraint may include ensuring the voltage at each of the neutral point of the transformers is less than the rated insulation voltage of the corresponding neutral point of the transformer. In other words, each of the transformers may include a rated insulation voltage, which means that if the voltage exceeds the rated insulation voltage, the insulation may degrade. Accordingly, the optimized compensation voltage may include a voltage that makes the voltage seen at the transformer less than the insulation voltage. Another example of a constraint may include a minimum voltage that can be produced by the voltage source (e.g., DC voltage source, tertiary winding, etc.). The compensation voltage would then need to be equal to or greater than the minimum voltage that can be produced by the voltage source. Thus, when the system is determining the optimal compensation voltage, the system may take into account different constraints on the possible voltage.

At 104 the system may determine whether a DC storage or source device (e.g., battery, solar cell, etc.) can supply the compensation voltage. For example, the transformer system or transformer grid system may include one or more batteries, for example, to participate in the upgrade deferral or congestion relief. These batteries may, in the system as described herein, be used to supply the compensation voltage. In determining whether the batteries or other DC source can supply the compensation voltage, the system may identify the expected level of the DC storage device. For example, the system may identify how much of a voltage the DC source can supply. The system may also determine whether the DC source is capable of supplying the compensation voltage. For example, if the compensation voltage is greater than the maximum supply of the DC source, the system may determine that the DC source cannot supply the compensation voltage.

If, at 104, the system determines that the DC source can supply the compensation voltage, the system may, at 105, use the DC source to supply the compensation voltage. Using the DC source may include using a control circuit operatively coupled to the DC source to switch the DC source from one mode to another, where one of the modes includes a mode for operating the battery as a compensation voltage supply source, herein referred to as a geomagnetic disturbance (GMD) mode for ease of readability. Another of the modes may include an operating mode where the battery participates in upgrade deferral or congestion relief. While in the GMD mode, the battery may be used to apply the compensation voltage.

If, however, the system determines at 104 that the compensation voltage cannot be supplied by the DC source, the system may use the tertiary winding of the transformer at 106 to apply the compensation voltage. The tertiary winding of the transformer supplies an alternating current (AC) voltage, so this voltage will need to be converted to DC using an AC to DC converter. Accordingly, the system will use the tertiary winding of the transformer to supply a converted compensation voltage to the transformer system.

Applying the compensation voltage may include providing a voltage (i.e., charging) or removing a voltage or applying a negative voltage (i.e., discharging) from one or both of the transformers. The system may not be able to completely discharge the induced voltage due to constraints on the system, as discussed above. Accordingly, the system will likely have to apply some form of charging voltage. However, both of the transformers do not have to be treated in the same manner (e.g., both charged, both discharged, etc.). In other words, both transformers do not have to be either charged or discharged at the same rate. For example, both transformers do not have to be charged with 1V. Rather, the system may charge one transformer and discharge the other transformer or apply different voltages to each of the transformers. Additionally, one of the transformers may not be either charged or discharged. For example, if the compensation voltage is equal to the voltage caused by the induced potential, the system may not charge or discharge that transformer.

Accordingly, using the systems and methods as described herein, in the event that a geomagnetic disturbance is forecasted, the system can be configured to estimate the induced potential that will be generated by the geomagnetic disturbance and optimize and supply a compensation voltage to the transformer system in order to reduce or even nullify the induced potential. In other words, the system generates equivalent DC potential across the two ends of the transmission line of the transformers at the neutrals to reduce or nullify the induced DC potential and its magneto-motive force in the magnetic circuits during a geomagnetic disturbance. By maintaining the equivalent potential or close to across the two ends of the transformer neutral, the amount of geomagnetically induced potential flow will be almost zero.

Figure 3:
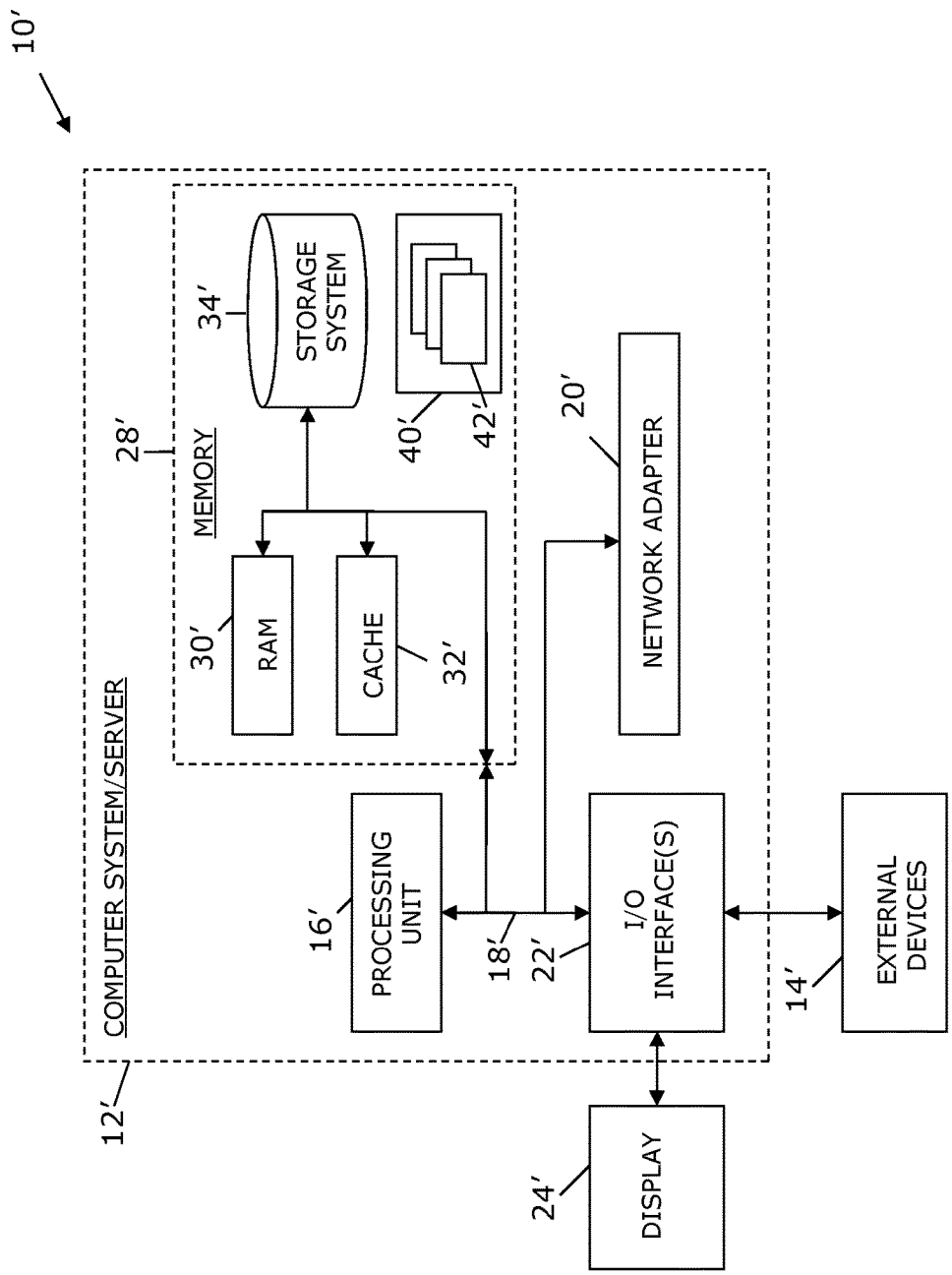
FIG. 3 illustrates a computer system.

As shown in FIG. 3, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
utilizing at least one processor to execute computer code that performs the steps of:
receiving forecasted geomagnetic information caused by solar activity;
estimating, using the forecasted geomagnetic information, a geomagnetically induced potential for each of a plurality of transformers operatively coupled to a transmission line, wherein the geomagnetically induced potential is created by geomagnetic disturbances identified using the forecasted geomagnetic information, wherein the estimating comprises predicting a time for the geomagnetically induced potential to affect the transformer;
determining an optimized compensation voltage to be applied to each of the plurality of transformers operatively coupled to the transmission line, wherein the optimized compensation voltage comprises a voltage that reduces the potential difference, caused by the geomagnetically induced potential, between neutral lines of the plurality of transformers, wherein the determining comprises ensuring the voltage at each of the neutral lines of the plurality of transformers is less than the rated insulation voltage of the corresponding neutral point; and
applying the optimized compensation voltage to each of the plurality of transformers operatively coupled to the transmission line at the predicted time for the geomagnetically induced potential to affect the transformer, wherein the applying the optimized compensation voltage comprises at least one of: charging at least one of the plurality of transformers to the optimized compensation voltage determined for the at least one of the plurality of transformers and discharging at least one of the plurality of transformers to the optimized compensation voltage determined for the at least one of the plurality of transformers.

2. The method of claim 1, wherein the determining an optimized compensation voltage comprises minimizing the total amount of optimized compensation voltage required.

3. The method of claim 1, wherein the determining an optimized compensation voltage comprises identifying at least one constraint for the optimized compensation voltage.

4. The method of claim 3, wherein the at least one constraint comprises a minimum voltage generated by a voltage source and wherein the optimized compensation voltage comprises a voltage greater than the minimum voltage generated by the voltage source.

5. The method of claim 1, wherein the applying the optimized compensation voltage comprises at least one of: applying a voltage to at least one of the plurality of neutral lines and discharging at least one of the plurality of neutral lines.

6. The method of claim 1, wherein the applying the optimized compensation voltage comprises applying a voltage from a direct current storage device.

7. The method of claim 1, wherein the applying the optimized compensation voltage comprises applying a converted voltage from a tertiary winding of at least one of the plurality of transformers.

8. The method of claim 1, comprising receiving transformer information describing geographic information of the transformer and electrical parameters of the transformer.

9. The method of claim 1, wherein the forecasted geomagnetic information comprises solar wind speed, proton ion density, temperature, and interplanetary magnetic variations.

10. An apparatus, comprising:
at least one processor; and
a computer readable storage medium having computer readable program code embodied therewith and executable by the at least one processor, the computer readable program code comprising:
computer readable program code that receives forecasted geomagnetic information caused by solar activity;
computer readable program code that estimates, using the forecasted geomagnetic information, a geomagnetically induced potential for each of a plurality of transformers operatively coupled to a transmission line, wherein the geomagnetically induced potential is created by geomagnetic disturbances identified using the forecasted geomagnetic information, wherein the estimating comprises predicting a time for the geomagnetically induced potential to affect the transformer;
computer readable program code that determines an optimized compensation voltage to be applied to each of the plurality of transformers operatively coupled to the transmission line, wherein the optimized compensation voltage comprises a voltage that reduces the potential difference, caused by the geomagnetically induced potential, between neutral lines of the plurality of transformers, wherein the determining comprises ensuring the voltage at each of the neutral lines of the plurality of transformers is less than the rated insulation voltage of the corresponding neutral point; and
computer readable program code that applies the optimized compensation voltage to each of the plurality of transformers operatively coupled to the transmission line at the predicted time for the geomagnetically induced potential to affect the transformer, wherein the applying the optimized compensation voltage comprises at least one of: charging at least one of the plurality of transformers to the optimized compensation voltage determined for the at least one of the plurality of transformers and discharging at least one of the plurality of transformers to the optimized compensation voltage determined for the at least one of the plurality of transformers.

11. A computer program product, comprising:
a computer readable storage medium having computer readable program code embodied therewith, the computer readable program code executable by a processor and comprising:
computer readable program code that receives forecasted geomagnetic information caused by solar activity;
computer readable program code that estimates, using the forecasted geomagnetic information, a geomagnetically induced potential for each of a plurality of transformers operatively coupled to a transmission line, wherein the geomagnetically induced potential is created by geomagnetic disturbances identified using the forecasted geomagnetic information, wherein the estimating comprises predicting a time for the geomagnetically induced potential to affect the transformer;
computer readable program code that determines an optimized compensation voltage to be applied to each of the plurality of transformers operatively coupled to the transmission line, wherein the optimized compensation voltage comprises a voltage that reduces the potential difference, caused by the geomagnetically induced potential, between neutral lines of the plurality of transformers, wherein the determining comprises ensuring the voltage at each of the neutral lines of the plurality of transformers is less than the rated insulation voltage of the corresponding neutral point; and
computer readable program code that applies the optimized compensation voltage to each of the plurality of transformers operatively coupled to the transmission line at the predicted time for the geomagnetically induced potential to affect the transformer, wherein the applying the optimized compensation voltage comprises at least one of: charging at least one of the plurality of transformers to the optimized compensation voltage determined for the at least one of the plurality of transformers and discharging at least one of the plurality of transformers to the optimized compensation voltage determined for the at least one of the plurality of transformers.

12. The computer program product of claim 11, wherein the determining an optimized compensation voltage comprises minimizing the total amount of optimized compensation voltage required.

13. The computer program product of claim 11, wherein the determining an optimized compensation voltage comprises identifying at least one constraint for the optimized compensation voltage.

14. The computer program product of claim 11, wherein the applying the optimized compensation voltage comprises at least one of: applying a voltage to at least one of the plurality of neutral lines and discharging at least one of the plurality of neutral lines.

15. The computer program product of claim 11, wherein the applying the optimized compensation voltage comprises applying a voltage from a direct current storage device.

16. The computer program product of claim 11, wherein the applying the optimized compensation voltage comprises applying a converted voltage from a tertiary winding of at least one of the plurality of transformers.

17. The computer program product of claim 11, comprising receiving transformer information describing geographic information of the transformer and electrical parameters of the transformer.

18. A method, comprising:
utilizing at least one processor to execute computer code that performs the steps of:
obtaining forecasted solar activity;
obtaining parameter information of a plurality of transformers connected to a transmission line, wherein the parameter information identifies a geographic location for each of the plurality of transformers and electrical parameters for each of the plurality of transformers and the transmission line;
estimating, based upon the obtained forecasted solar activity and obtained parameter information, a geomagnetically induced potential for the plurality of transformers, caused by geomagnetic disturbances identified using the forecasted solar activity and an estimated time of the geomagnetically induced potential, wherein the estimating comprises predicting a time for the geomagnetically induced potential to affect the plurality of transformers;
identifying a compensation voltage to be applied to each of the plurality of transformers, wherein the compensation voltage comprises a voltage that reduces the potential difference, caused by the geomagnetically induced potential, between neutral lines of the plurality of transformers, wherein the identifying comprises ensuring the voltage at each of the neutral lines of the plurality of transformers is less than the rated insulation voltage of the corresponding neutral point; and
compensating for the geomagnetically induced potential by applying the compensation voltage to each of the plurality of transformers using at least one of: a direct current source and a tertiary winding of at least one of the plurality of transformers at the estimated time of the geomagnetically induced potential, wherein the applying the compensation voltage comprises at least one of: charging at least one of the plurality of transformers to the optimized compensation voltage determined for the at least one of the plurality of transformers and discharging at least one of the plurality of transformers to the optimized compensation voltage determined for the at least one of the plurality of transformers.

* * * * *